(12) United States Patent
Beardsley et al.

(10) Patent No.: US 8,566,518 B2
(45) Date of Patent: *Oct. 22, 2013

(54) INTELLIGENT WRITE CACHING FOR SEQUENTIAL TRACKS

(75) Inventors: Brent C. Beardsley, Tucson, AZ (US); Michael T. Benhase, Tucson, AZ (US); Lokesh M. Gupta, Tucson, AZ (US); Joseph S. Hyde, II, Tucson, AZ (US); Sonny E. Williams, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,189

(22) Filed: May 23, 2012

(65) Prior Publication Data
US 2012/0233408 A1 Sep. 13, 2012

Related U.S. Application Data

(63) Continuation of application No. 12/894,017, filed on Sep. 29, 2010.

(51) Int. Cl.
*G06F 12/00* (2006.01)
(52) U.S. Cl.
USPC .................... 711/113; 711/103; 711/E12.069
(58) Field of Classification Search
USPC .................................................. 711/113, 103
See application file for complete search history.

(56) References Cited

U.S. PATENT DOCUMENTS

| | | | |
|---|---|---|---|
| 5,636,359 | A | 6/1997 | Beardsley et al. |
| 6,112,277 | A | 8/2000 | Bui et al. |
| 6,192,450 | B1 * | 2/2001 | Bauman et al. ............... 711/135 |
| 6,470,421 | B1 | 10/2002 | Bui et al. |
| 6,513,097 | B1 | 1/2003 | Beardsley et al. |
| 6,658,542 | B2 | 12/2003 | Beardsley et al. |
| 6,704,837 | B2 | 3/2004 | Beardsley et al. |
| 2003/0105928 | A1 | 6/2003 | Ash et al. |

OTHER PUBLICATIONS

Gustavo Castets et al., "IBM TotalStorage Enterprise Storage Server Model 800," http://www.ibm.com/redbooks, Oct. 2002, 312 pages.
Pawan Goyal et al., "CacheCOW: QoS for Storage System Caches," ACM Digital Library, 2003, pp. 498-515.
Jung-ho Huh et al., "Hierarchical Disk Cache Management in RAID 5," Consortium for Computing Sciences in Colleges: Northwestern Conference, JCSC 19, 2, Dec. 2003, pp. 47-59.
Alexander Thomasian et al., "RAID5 Performance with Distributed Sparing," IEEE Transactions on Parallel and Distributed Systems, vol. 8, No. 6, Jun. 1997, pp. 640-657.

* cited by examiner

*Primary Examiner* — Reginald Bragdon
*Assistant Examiner* — Hamdy S Ahmed
(74) *Attorney, Agent, or Firm* — Griffiths & Seaton PLLC

(57) ABSTRACT

Write caching for sequential tracks is performed by a processor device in a computing storage environment for destaging data from nonvolatile storage (NVS) to a storage unit. If a first track is determined to be sequential, and an earlier track is also determined to be sequential, a temporal bit associated with the earlier track is cleared to allow for destage of data of the earlier track. If a temporal bit for one of a plurality of additional tracks in one of a plurality of strides in a modified cache is determined to be not set, a stride associated with the one of the plurality of additional tracks is selected for a destage operation. If the NVS exceeds a predetermined storage threshold, a predetermined one of the plurality of strides is selected for the destage operation.

7 Claims, 4 Drawing Sheets

INTELLIGENT WRITE CACHING FOR SEQUENTIAL TRACKS

BACKGROUND OF THE INVENTION

1. Field of the Invention

The present invention relates in general to computers, and more particularly to a method, system, and computer program product for intelligent write caching for sequential tracks in a computing storage environment.

2. Description of the Related Art

In enterprise data processing arrangements, such as may be used in a company, government agency or other entity, information is often stored on servers and accessed by users over, for example, a network. The information may comprise any type of information that of programs and/or data to be processed. Users, using their personal computers, workstations, or the like (generally, "computers") will enable their computers to retrieve information to be processed, and, in addition, to store information, for example, on remote servers.

Generally, servers store data in mass storage subsystems that typically include a number of disk storage units. Data is stored in units, such as files. In a server, a file may be stored on one disk storage unit, or alternatively portions of a file may be stored on several disk storage units. A server may service access requests from a number of users concurrently, and it will be appreciated that it will be preferable that concurrently serviced access operations be in connection with information that is distributed across multiple disk storage units, so that they can be serviced concurrently. Otherwise stated, it is generally desirable to store information in disk storage units in such a manner that one disk drive unit not be heavily loaded, or busy servicing accesses, and while others are lightly loaded or idle. To provide redundancy and increase performance, many storage devices may be configured in a redundant array of independent disks (RAID) topology, where storage volumes are organized in RAID ranks.

A computer network of a business may have multiple storage networks that are located remote from one another and a business user. The storage networks may also be hosted on different types of systems. To perform the job correctly, the business user may require fast and reliable access to the data contained in all of the storage networks. Since access to this data occurs in real time, is desirable that storage operations (such as write or reads) occur as quickly as possible.

SUMMARY OF THE INVENTION

To move data, mass storage subsystems destage data from Non-Volatile Storage (NVS) to the RAID devices, for example. Current management of a write cache, operational in mass storage subsystems in conjunction with the RAID and NVS devices, may cause lengthy destage transactions when sequential tracks (portions of data arranged sequentially) are involved, as will be further described. A need exists for a mechanism to more efficiently manage write cache operations involving sequential tracks.

In view of the foregoing, various method, system, and computer program product embodiments for, in a computing storage environment for destaging data from nonvolatile storage (NVS) to a storage unit, write caching for sequential tracks by a processor device are provided. In one embodiment, by way of example only, if a first track is determined to be sequential, and an earlier track is also determined to be sequential, a temporal bit associated with the earlier track is cleared to allow for destage of data of the earlier track. If a temporal bit for one of a plurality of additional tracks in one of a plurality of strides in a modified cache is determined to be not set, a stride associated with the one of the plurality of additional tracks is selected for a destage operation. If the NVS exceeds a predetermined storage threshold, a predetermined one of the plurality of strides is selected for the destage operation.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below describe efficient and highly scalable mechanisms for intelligent write caching for sequential tracks (for destage from NVS to one or more storage units) to lessen impact on overall storage performance. These mechanisms provide for more aggressive destaging of sequential tracks in the write cache, do not destage the last stride in the sequential streams currently being written, and maintain working sets of tracks (tracks updated frequently) in the write cache for longer periods. As a result, the illustrated embodiments provide for better throughput on the write cache since sequential tracks are destaged more aggressively, slow down destages of pseudo-sequential working sets, and retain destage conflicts at a minimum since tracks being written are not destaged.

Figure 1:
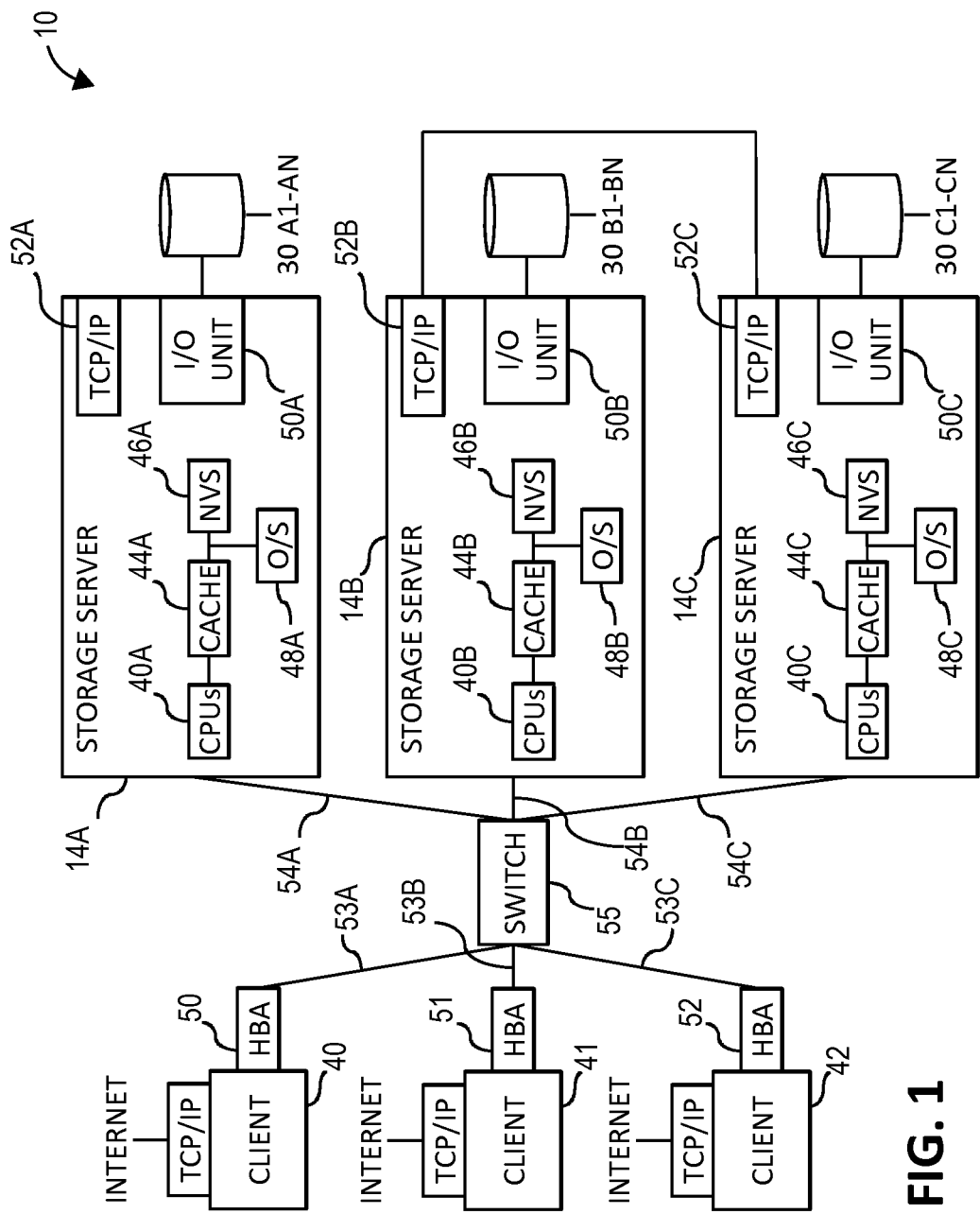
FIG. 1 is a block diagram of a distributed computer system including storage servers and a storage management server, in which aspects of the following description and claimed subject matter may be implemented.

FIG. 1 hereafter provides one example of a portion of a mirrored data storage system architecture in which the mechanisms of the illustrative embodiments may be implemented. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

FIG. 1 illustrates an exemplary distributed computer system generally designated 10 which includes the present invention. System 10 comprises multiple, similar storage servers/controllers 14a,b,c with multiple CPUs 40a,b,c per cluster (See FIG. 2, following, for CPU organization in each cluster), cache 44a,b,c, nonvolatile storage ("NVS") 46a,b,c, operating system 48a,b,c, I/O unit 50a,b,c, and TCP/IP adapter card 52a,b,c. Each of the storage servers 14a,b,c manages storage allocation and access to multiple storage devices (such as disks) 30a1-an, 30b1-bn, and 30c1-cn, respectively, by clients 40, 41 and 42.

CPUs 40, 41 and 42 have adapter cards 50, 51 and 52, such as a Fibre Channel adapter cards, for connection via a communication path 53a,b,c, such as a Fibre Channel, to a switch 55. Switch 55 can be coupled to storage servers 14a,b,c via host busses 54a,b,c, and can forward a request from any of the clients 40, 41 or 42 to any of the storage servers 14a,b,c as configured on the client. An administrator has allocated to each of the clients 40, 41 and 42 a number of storage "volumes." Each "volume" resides on a storage array. A "storage array" can comprise one or more storage devices and be configured in a variety of RAID levels such as RAID 5, RAID 10 or Just a Bunch of Disks (commonly referred to as JBOD).

Figure 2:
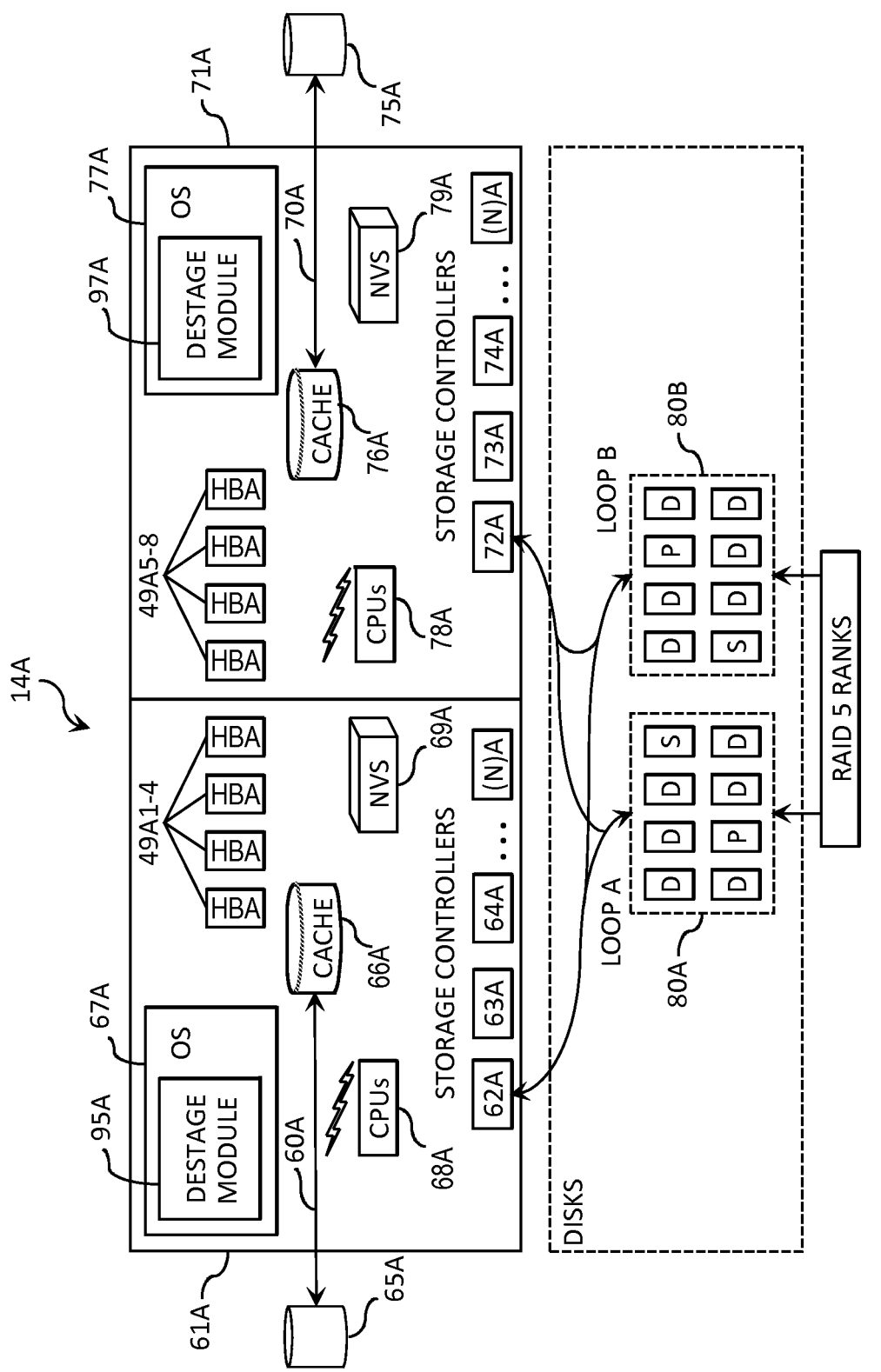
FIG. 2 is a block diagram of one of the storage servers of FIG. 1.

In the exemplary embodiment illustrated in FIG. 2, storage controller 14a (and likewise storage controller 14b and c) includes two identical clusters 61a and 71a of CPUs 68a and 78a, cache 66a and 76a, NVS 69a and 79a, and any number of pairs of device adapters (62a-(N)a and 72a-(N)a per cluster). There is a shared cache (semiconductor) memory 66a and 76a for each cluster 61a and 71a, respectively. Cache 66a and 76a each contain a directory of tracks stored on each cache, respectively. The directory includes any number of directory entries associated with each of the tracks.

Each cluster also contains battery backed-up storage 69a and 79a (also called "NVS"). In FIG. 2, "D" represents a data disk, "P" represents a parity disk for storing parity bits for the data in the data disks, and "S" represents a spare disk in the event of failure of a data disk or parity disk. Each cluster maintains a mapping of the storage allocation to each client that correlates each storage volume to corresponding physical locations on the storage arrays.

NVS 69a and 79a are interconnected with disks 65a and 75a via communication links 60a and 70a, respectively. In certain embodiments, communication links 60a and 70a are selected from a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, disks 65a and 75a comprise one or more optical storage media, one or more magnetic storage media, one or more electronic storage media, and combinations thereof. In certain embodiments, disks 65a and 75a are external to clusters 61a and 71a. In certain embodiments, disks 65a and 75a are internal to clusters 61a and 71a.

When the client requests access to storage, i.e. to read from or write to data in one of the volumes allocated to the client, then the storage cluster that manages that volume will process the request, i.e. temporarily store client updates into the cache memory and NVS (if the request is a write) on the paired cluster. For update requests, an I/O completion notification is sent to the client upon NVS store. Upon reaching an internal threshold for pending writes, the cluster will map the client request to the physical locations, and then forward the mapped request from the cache storage to the appropriate storage array. For read requests, data is either satisfied from cache memory or requires disk access (because of a "cache miss"). Cache misses for read requests require the cluster to map the client request to the physical locations on the storage array and transfer the data from the physical location on the arrays to the cache memory where it satisfies the client I/O request.

Referring again to FIG. 2, server 14a is shown including operating systems 67a and 77a, one for each cluster. As one of ordinary skill in the art will appreciate, operating systems 67a and 77a may be physically or virtually placed in a variety of locations. For purposes of illustration, the operating systems 67a and 77a are shown incorporated into each cluster as shown. In one embodiment, CPUs 68a and 78a may execute portions of the operating systems 67a and 77a. Each operating system 67a and 77a includes destage modules 95a, 97a, as is shown. In one embodiment, destage modules 95a and 97a may operate to implement various aspects of the present invention, in conjunction with the operating systems 67a and 77a, the depicted CPUs, cache memory, NVS, etc., such as performing destage scans and destage operations as will be further described. While destage modules 95a and 97a are shown incorporated into the operating systems 67a and 77a, one of ordinary skill in the art will appreciate that the destage modules 95a and 97a may be physically or logically located elsewhere, yet remain in communication with the depicted CPUs, cache memory, NVS, etc. Additional functionality of destage modules 95a and 97a will be further described, following.

The following terminology may be helpful to appreciate the following discussion regarding various functionality of the illustrated embodiments. First, a "stride" may refer to a set of tracks of data for which a RAID array computes parity. If a full stride is destaged, the RAID array may compute new parity from the full stride. If a partial stride is destaged, then the RAID array requires old data and old parity to compute the new parity. As a result, full stride destages require fewer operations than partial stride destages. Extra operations required for partial strides are known as "destage penalty." Finally, a host may be trying to write a track that is being destaged. The host write is required to wait until the destage is complete. This is known as a "destage conflict."

With the foregoing terminology in mind, in one of the illustrated embodiments of the present invention, the distributed computing environment and storage server depicted in FIGS. 1 and 2, previously, may use various mechanisms to manage the cache memory, NVS, and perform destage scans and destage operations, for example. One mechanism demotes tracks based on a least recently used (LRU)-based methodology, and maintains a temporal bit per track. The temporal bit is set when a host writes tracks. The temporal bit is reset when a destage scan examines a track having a temporal bit set. If the destage scan finds strides with no tracks having a temporal bit set, these tracks may be selected for destage. Another mechanism demotes tracks based on spatial location. A sorted list of tracks is maintained using a balanced tree. Destage scans looking for tracks to destage may traverse the balanced tree in the order of track location from lowest to highest, for example.

For sequential tracks, one of the aforementioned mechanisms ignores the temporal bit and destages sequential tracks when the destage scan comes across such sequential tracks. This is designed to improved throughput since, for sequential tracks, generally the entire stride is in cache. As a result, full stride destages may be accomplished, which are generally faster than partial stride destages. This scenario leads to freeing write cache space more quickly. In addition, throughput increases as sequential tracks aren't continually re-written.

While current mechanisms improve overall throughput, some transaction times may be increased, since selecting sequential tracks with a set temporal bit may lead to destage conflicts. Such a result may follow, from the following exemplary scenario. A write to a particular track needs to wait for a destage to complete. Tracks containing multiple records may require multiple updates, as some applications that write tracks sequentially may write one record at a time, and associated sequential tracks would have their temporal bit set. Since current mechanisms generally ignore the temporal bit for sequential tracks, a particular track may be destage which was being updated one record at a time.

In addition to potentially longer transaction times, some working sets of tracks (e.g., IP Multimedia Subsystem (IMS) write ahead data set (WADS) tracks) are detected sequentially, but may not be written in a purely sequential fashion. For example, consider a working set of tracks 1-8 that written in the order 4,3,2,1,8,7,6,5. These tracks may be detected as being sequential in nature. As previously mentioned, working sets of tracks are updated frequently, and correspondingly are written to at a higher frequency. Current mechanisms will destage these working sets if they are detected as sequential.

In view of the foregoing, and as previously mentioned, a need exists for a mechanism to reduce transaction times in scenarios involving such sequential tracks. Again, as previously mentioned, the mechanisms of the illustrated embodiments serve to address this need by providing for more aggressive destaging of sequential tracks in the write cache, refrain from destaging the last stride in the sequential streams currently being written, and maintaining working sets of tracks (tracks updated frequently) in the write cache for longer periods. As a result, the illustrated embodiments provide for better throughput on the write cache since sequential tracks are destaged more aggressively, slow down destages of pseudo-sequential working sets, and retain destage conflicts at a minimum since tracks being written are not destaged.

Figure 3:
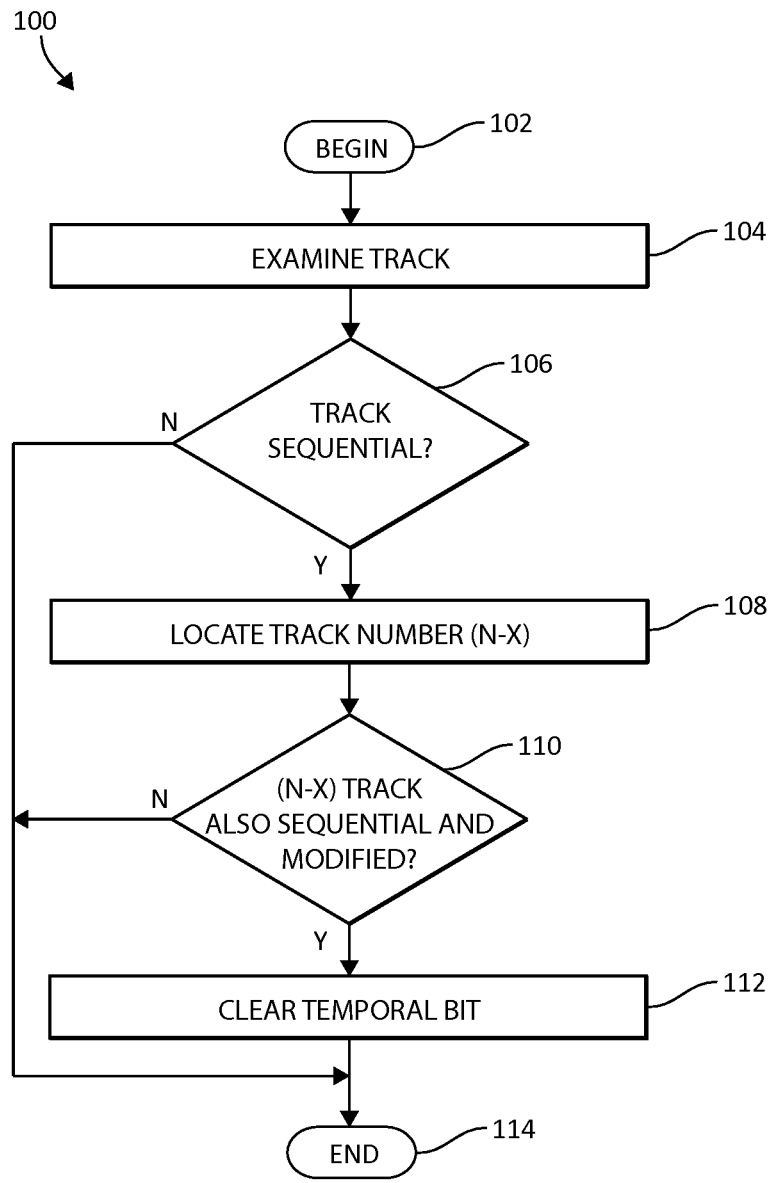
FIG. 3 is a flow chart diagram of an exemplary method for write caching for sequential tracks according to various aspects of the present invention pursuant to a host write operation.

Turning now to FIG. 3, an exemplary method 100 for performing a host write operation is depicted, incorporating various aspects of the present invention and following claimed subject matter. Method 100 begins (step 102) by examining a track (step 104) to determine if it is sequential in nature (step 106). If so, the track whose number is X less than the present track is located (N-X) (step 108). In other words, an earlier track in the stride is located, based on a predetermined formula. In one embodiment, by default, X is 28, although one of ordinary skill in the art will appreciate that X may vary according to a particular implementation.

Moving to step 110, if the (N-X) track is determined to be also sequential and modified, its associated temporal bit is cleared (step 112) allowing for destage of the earlier track. The method 100 ends (step 114). Returning to steps, 106, if the track is not determined to be sequential, and in step 110, if the (N-X) track is not determined to be additionally sequential and modified, the method 100 ends (again, step 114).

Figure 4:
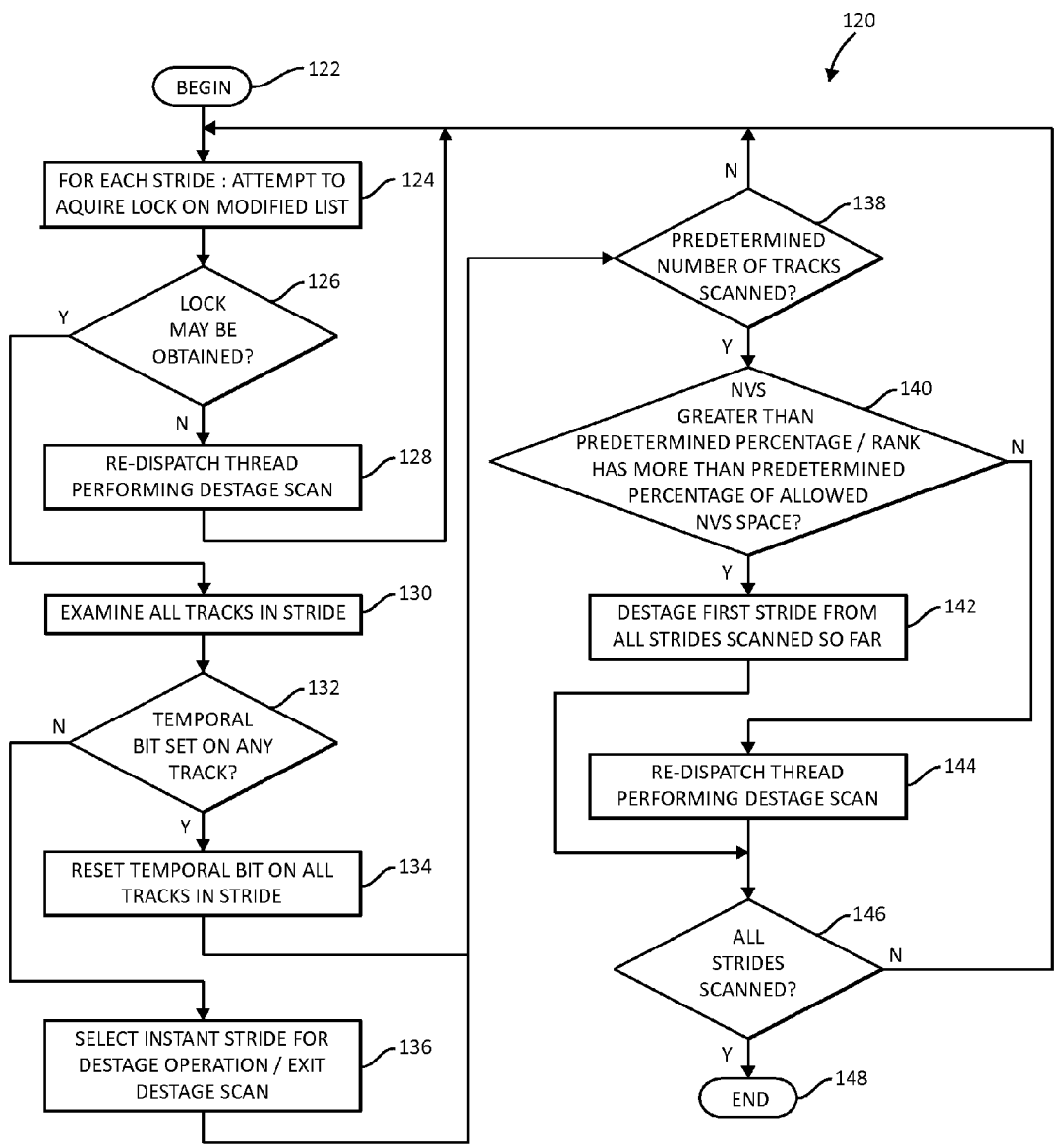
FIG. 4 is a flow chart diagram of an exemplary method for write caching for sequential tracks according to various aspects of the present invention pursuant to a destage scan operation.

Turning now to FIG. 4, an exemplary method 120 for performing destage scans is illustrated, again incorporating various aspects of the present invention and following claimed subject matter. Method 120 is performed for each stride in the modified cache memory, and begins (step 122) with an attempt to acquire a lock on the modified list (step 124). If the lock cannot be obtained (step 126), then the thread performing the destage scan is re-dispatched (step 128), and the method 120 returns to step 124 to perform an additional scan.

If a lock is obtained (again, step 126), then tracks in the stride are examined (step 130) to determine if one or more has the temporal bit set (step 132). If none of the tracks in the stride have the temporal bit set (e.g., all tracks in stride have been examined, the instant stride is selected for performing the destage operation, and the destage scan is exited (step 136, continuing to step 138 as will be further described). Returning to step 132, if a track is found with a temporal bit set, the method 120 moves to step 134, where the temporal bit is reset for all tracks in the stride. Following steps 134 or 136 as previously described, the method 120 moves to step 138, which queries if a predetermined number of tracks have been scanned. Again, in one embodiment, the predetermined number may be 4, but one of ordinary skill in the art will appreciate that the predetermined number may vary according to a particular implementation. If this is not the case, the method returns to step 124 to perform additional scans.

If in fact the predetermined number of strides have been scanned, the level of NVS occupancy is examined. If the NVS occupancy is greater than a predetermined percentage or the rank has greater than the predetermined percentage of allowed NVS space (step 140), then the first stride from all the strides scanned so far is selected for the destage operation (step 142). Here again, the predetermined percentage may vary according to a particular implementation, and in one embodiment, may be 90% (e.g., the NVS is greater than 90% full or the rank has more than 90% of its allowed NVS space). Returning to step 140, if the result is no, the thread performing the destage scan is re-dispatched (step 144). If all strides in the modified cache have not yet been scanned (step 146), then the method 120 returns to step 124 to perform more scanning operations as depicted. If all strides have been scanned, the method 120 then ends (step 148).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. In a computing storage environment for destaging data from nonvolatile storage (NVS) to a storage unit, a method for write caching for sequential tracks by a processor device, comprising:
    obtaining a lock on a modified list including tracks and strides;
    if the lock is obtained, performing at least one of:
        examining a plurality of tracks in a plurality of strides for determining if a temporal bit is set on any one of the plurality of tracks;
        resetting the temporal bit on each one of the plurality of tracks, if the temporal bit is set on any one of the plurality of tracks, wherein:
            if a first track is determined to be sequential, and an earlier track is also determined to be sequential, clearing the temporal bit associated with the earlier track to allow for destage of data of the earlier track, and
            if the first track is determined not to be sequential, and the earlier track is also determined not to be sequential, ending the method for write caching, and
        if the temporal bit for one of the plurality of tracks in one of a plurality of strides in a modified cache is determined to be not set, selecting a stride associated with the one of the plurality of tracks for a destage operation, wherein if the NVS exceeds a predetermined storage threshold, selecting a predetermined one of the plurality of strides for the destage operation; and
    if the lock is not obtained, then re-dispatching a thread performing a destage scan.

2. The method of claim 1, further including examining the first track to determine if the first track is sequential.

3. The method of claim 1, wherein clearing the temporal bit associated with the earlier track is performed pursuant to a host write request.

4. The method of claim 1, wherein selecting the stride associated with the one of the plurality of tracks is performed pursuant to a destage scan operation.

5. The method of claim 1, wherein the earlier track is computed by obtaining (N-X) tracks less than the first track, where N is the track number and X is a predetermined umber.

6. The method of claim 4, further including pursuant to selecting the predetermined one of the plurality of strides for the destage operation, re-dispatching a thread performing the destage scan operation.

7. The method of claim 1, wherein selecting the stride associated with the one of the plurality of tracks for the destage operation is performed for each of the plurality of strides in the modified cache.

* * * * *